United States Patent
Park et al.

(10) Patent No.: US 8,524,016 B2
(45) Date of Patent: Sep. 3, 2013

(54) METHOD OF MAKING AN AUSTEMPERED DUCTILE IRON ARTICLE

(75) Inventors: Junyoung Park, Greer, SC (US); Jason Robert Parolini, Greer, SC (US)

(73) Assignee: General Electric Company, Schenectady, NY (US)

( * ) Notice: Subject to any disclaimer, the term of this patent is extended or adjusted under 35 U.S.C. 154(b) by 64 days.

(21) Appl. No.: 13/342,711

(22) Filed: Jan. 3, 2012

(65) Prior Publication Data

US 2013/0167984 A1 Jul. 4, 2013

(51) Int. Cl.
*C21D 9/28* (2006.01)
*C21D 6/00* (2006.01)

(52) U.S. Cl.
USPC .......................... 148/548; 148/663; 164/477

(58) Field of Classification Search
USPC ..... 148/543, 663, 321–323, 548; 420/13–33; 164/477
See application file for complete search history.

(56) References Cited

U.S. PATENT DOCUMENTS

| | | | |
|---|---|---|---|
| 4,222,429 A * | 9/1980 | Kemp | 164/34 |
| 4,880,477 A | 11/1989 | Hayes et al. | |
| 5,028,281 A | 7/1991 | Hayes et al. | |
| 5,139,579 A | 8/1992 | Kovacs et al. | |
| 2010/0006189 A1 | 1/2010 | Larker | |

OTHER PUBLICATIONS

Kruse, "Supporting Wind's Power", Engineered Casting solutions, 17-22, 2006.*
J.D. DeLa'O et al., "Thermomechanical Processing of Austempered Ductile Iron", The Minerals, Metals & Materials Society, 1997, pp. 79-100.

* cited by examiner

*Primary Examiner* — Deborah Yee
(74) *Attorney, Agent, or Firm* — Cantor Colburn LLP (57) ABSTRACT

A method of making an austempered ductile iron article is disclosed. The method includes providing a melt of a ductile iron alloy composition. The method also includes casting the melt into a mold to form a casting. The method further includes cooling the casting to an austempering temperature by circulating a coolant through the mold; wherein cooling comprises solidifying the melt and forming a ductile iron article. Still further, the method includes heating the casting to maintain the austempering temperature for an interval sufficient to form an austempered ductile iron article that comprises a microstructure comprising ausferrite.

20 Claims, 5 Drawing Sheets

METHOD OF MAKING AN AUSTEMPERED DUCTILE IRON ARTICLE

BACKGROUND OF THE INVENTION

A method of making an austempered ductile iron article is disclosed, and more particularly, a method of making large austempered ductile iron articles, and even more particularly, a method of making an austempered ductile iron main shaft of a wind turbine.

Various alloys have been considered and used to produce large shafts, such as the main shaft of a wind turbine. As an example, forged steel alloys are commonly used for main shafts in wind turbine applications. While forged steel wind turbine shafts are useful, they are generally costly due to their size and the mechanical processing (e.g., forging), heat treating and machining required to obtain the necessary alloy properties.

Due to their strength, toughness, castability and machinability, ductile iron (cast nodular iron) alloys have also been used to produce wind turbine main shafts. Typical production methods for these shafts have included conventional sand casting, which has generally been employed to produce relatively smaller shafts having wall section thicknesses of less than fifteen centimeters. While this approach has been useful to produce ductile iron wind turbine shafts, the shafts are not well-suited to the demanding service requirements of more recent wind turbine designs, which include larger sizes, including higher casting weights, larger diameters and larger shaft wall section thicknesses. As larger main shafts become required for wind turbine applications, their design requirements for strength and toughness have exceeded the capability of conventional cast ductile iron alloys, and methods that enable the manufacture of ductile iron wind turbine main shafts having larger sizes, including higher casting weights, larger diameters and larger shaft wall section thicknesses are very desirable.

Therefore, improved methods of making ductile iron articles, particularly large ductile iron articles, such as the main shafts of wind turbines, are very desirable.

BRIEF DESCRIPTION OF THE INVENTION

According to one aspect, a method of making an austempered ductile iron article is disclosed. The method includes providing a melt of a ductile iron alloy composition. The method also includes casting the melt into a mold to form a casting. The method further includes cooling the casting to an austempering temperature by circulating a coolant through the mold; wherein cooling comprises solidifying the melt and forming a ductile iron article. Still further, the method includes heating the casting to maintain the austempering temperature for an interval sufficient to form an austempered ductile iron article that comprises a microstructure comprising ausferrite.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
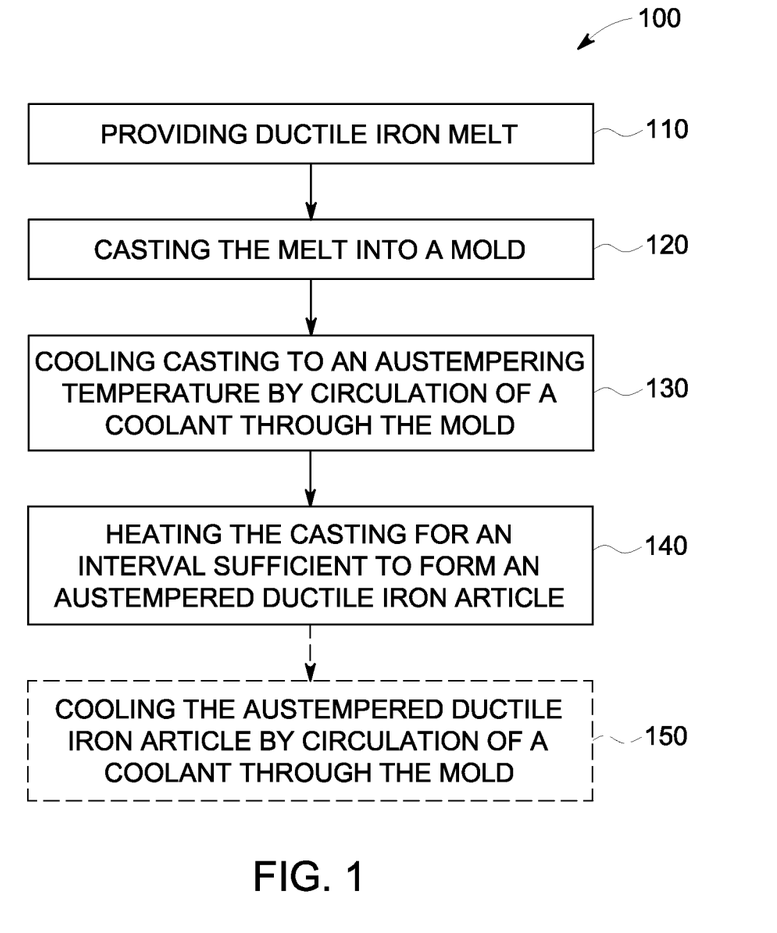
FIG. 1 is a flow chart of an exemplary embodiment of a method of making an austempered ductile iron article as disclosed herein.
Figure 2:
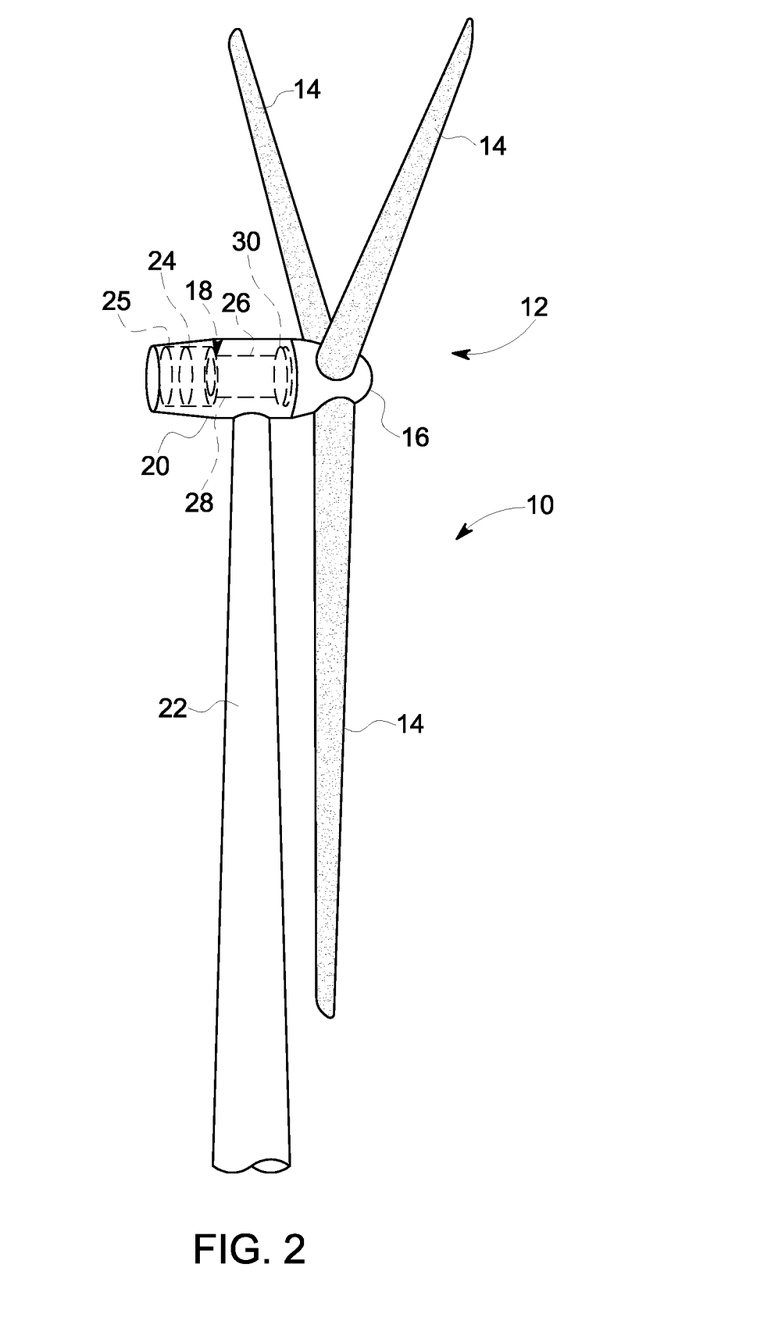
FIG. 2 is a schematic perspective view of an exemplary embodiment of a wind turbine as disclosed herein.
Figure 3:
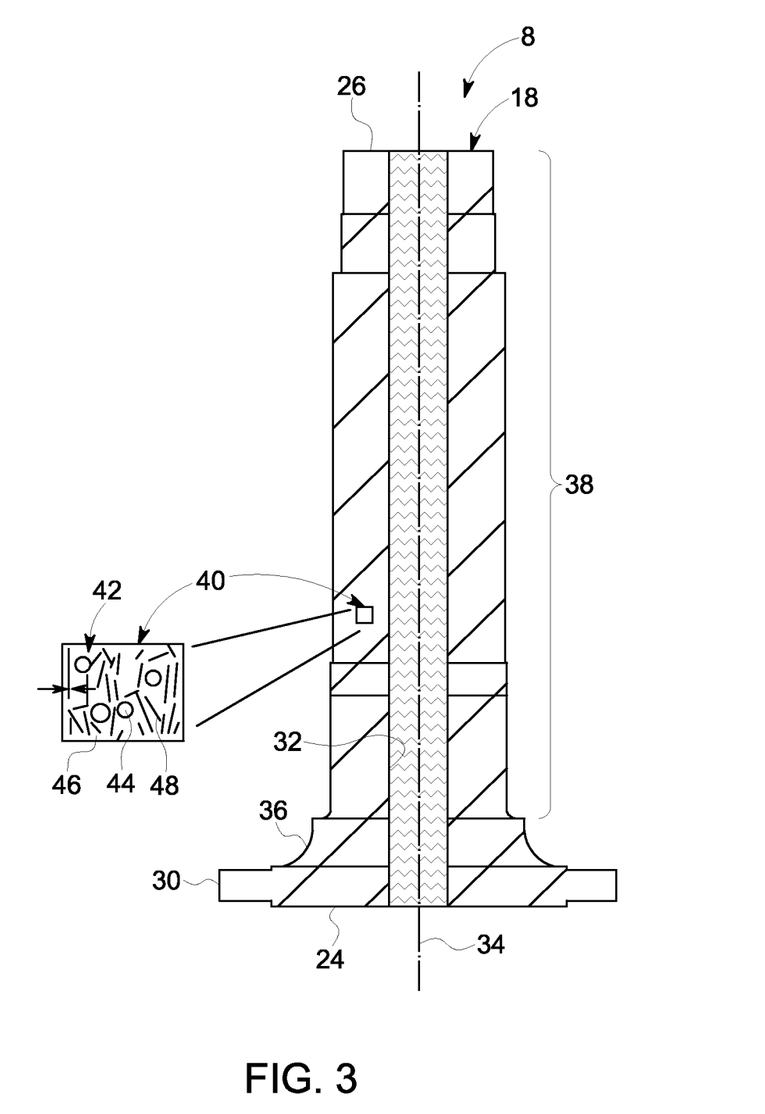
FIG. 3 is a schematic cross-sectional view of an exemplary embodiment of the main turbine shaft of the wind turbine of FIG. 2.
Figure 4:
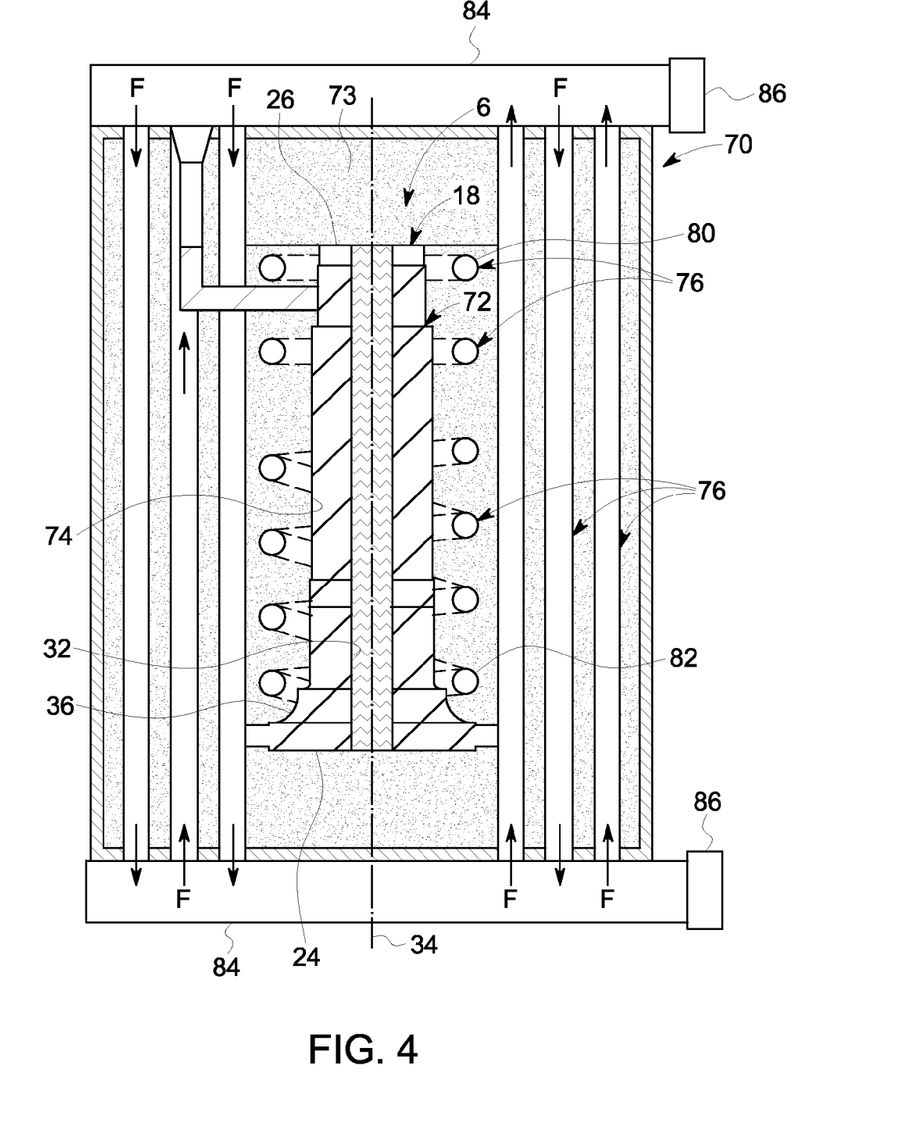
FIG. 4 is a schematic cross-sectional view of an exemplary embodiment of a mold and casting as disclosed herein.

Referring to FIGS. 1-5, an exemplary embodiment of a method 100 (FIG. 1) of making an austempered ductile iron article 8 is disclosed. The method includes providing 110 a melt of a ductile iron alloy composition. The method also includes casting 120 the melt into a mold 70 to form a casting 72 (FIG. 4). The method further includes cooling 130 the casting 72 to an austempering temperature by circulating a coolant through the mold 70, wherein cooling comprises solidifying the melt and forming a ductile iron article 6. Still further, the method includes heating 140 the casting 72 to maintain the austempering temperature for an interval sufficient to form an austempered ductile iron article 8. Optionally, the method 100 also may include cooling 150 the austempered ductile iron article 8 after heating 140 by circulation of a coolant through the mold 70.

In certain embodiments, the use of the method 100 advantageously enables reduction or elimination of cooling and reheating of castings prior to performing the austempering heat treatment. In addition, when using the method 100 the size of the casting may be increased because the austempering heat treatment is no longer limited by the size of the salt bath furnaces typically used to perform the austempering heat treatment, whether by direct immersion of the ductile iron article or the article in its mold. Thus, the method 100 is particularly useful for making very large ductile iron articles 8, such as wind turbine shafts 18, where the article may weigh several tons or more, and have wall-section thicknesses that are very thick, including sections that are 100 mm thick or more. Another advantage realized using the method 100 is that the amount of Si can be raised up to about 4.5 wt % without reducing the carbon content in the austenite, which also provides solid solution strengthening of the ausferrite matrix. The use of low pressure steam or water as a coolant provides a finer cell structure, which leads to enhanced mechanical properties. The method 100 promotes rapid heat transfer with respect to both heating and cooling, thereby reducing cycle time and increasing the efficiency of the austempering heat treatment.

Referring to FIGS. 1-5, the method 100 may be used to make any suitable austempered ductile iron article 8, but is particularly well-suited to making large austempered articles, such as wind turbine main shafts 18 having a weight of about 2 to about 20 tons or more, and more particularly those having wall-section thicknesses of about 100 to about 200 mm or more. The austempered ductile iron articles 8 are made from appropriately sized cast ductile iron articles 6 that are formed by casting and austempered to provide austempered ductile iron articles 8 that advantageously have a hardness, strength and toughness that are higher than the precursor cast ductile iron articles 6. The method 100 may be used to make any suitable ductile iron article 8, but is particularly useful for making various large wind turbine components, and more particularly, for making large ductile iron wind turbine shafts 18. Wind turbine shafts 18 are essential components of a wind turbine 10. While wind turbine shafts 18 are essential wind turbine components, they generally have not been made from ductile cast iron owing to the fact that it has not been possible to obtain the ductility, strength, toughness and fatigue resistance required, particularly for large wind turbine shafts 18. The use of method 100 enables the manufacture of austempered ductile iron wind turbine shafts 18, and particularly the manufacture of large austempered ductile iron wind turbine shafts, as well as other large austempered ductile iron articles 8 for wind turbines 10 and other applications.

Wind turbine 10 generally includes a rotor blade assembly 12 comprising multiple blades 14 radially extending from a hub 16. The hub 16 is mounted on a rotatable austempered ductile iron wind turbine shaft 18 (FIGS. 2 and 3), which forms part of a drive train that includes a gearbox 24 connected to an electric generator 25. The austempered ductile iron wind turbine shaft 18, drive train and electric generator 25 are all housed within a nacelle 20 mounted on a tower 22. The rotatable austempered ductile iron wind turbine shaft 18 includes a hub end 26 and an opposed gearbox end 28. The hub end 26 includes an integral hub flange 30 that is formed on the hub end 26 and is configured for coupling and attachment to the hub 16. The gearbox end 28 is configured for coupling and attachment to the gearbox 24. The austempered ductile iron wind turbine shaft 18 generally includes a shaft bore 32 that extends along the longitudinal axis 34. The austempered ductile iron wind turbine shaft 18 also may include a transition collar 36 that smooths the transition from the outer portion of the shaft body 38 to the hub flange 30. Depending on the size of the turbine 10, the main austempered ductile iron wind turbine shaft 18 may be quite large, including those having a weight and wall-section thickness as described herein and lengths of about 2 m to about 4 m or more, main flange diameters of about 1 m to about 2 m or more and shaft bores of about 0.4 to about 0.8 m or more. Because the main shaft 18 must operate in cold weather and withstand a significant amount of torque of about 4000 to about 15,000 kNm and a bending moment of about 7,000 to about 15,000 kNm induced by the action of wind on the blades 14, the austempered ductile iron wind turbine shaft 18 is advantageous in that it provides a balance of strength and toughness sufficient to withstand these torques and bending moments.

As illustrated schematically in an exemplary embodiment in FIG. 3, the austempered ductile iron wind turbine shaft 18 made by the method 100 described herein may be described as having an austempered microstructure 40 comprising an ausferrite matrix 42 and a plurality of graphite nodules 44 dispersed in the ausferrite matrix 42. The ausferrite matrix 42 includes a carbon-stabilized austenite matrix 46 and acicular ferrite 48. Forming the ausferrite by austempering in accordance with the method 100 forms greatly increases hardness, impact strength, tensile strength and low cycle fatigue strength of the ductile iron article 8, including ductile iron wind turbine shaft 18.

Providing 110 of a ductile iron melt may be performed in any suitable manner. A ductile iron alloy composition may, for example, be melted in a special type of blast furnace known as a cupola, but may also be melted in various electric induction furnaces. After melting is complete, the molten ductile iron alloy composition is generally poured into a holding furnace or ladle. The molten ductile iron alloy composition may be formed by re-melting pig iron, often along with substantial quantities of scrap iron and scrap steel and taking various steps to remove undesirable contaminants. Depending on the application, the carbon and silicon content may be adjusted to the desired levels. Other alloying elements may then be added to the melt before the final form is produced by casting. A wide variety of ductile iron alloy compositions and ductile iron articles 6 may be provided in accordance with method 100 as disclosed herein, including wind turbine shaft 18. The ductile iron alloy compositions may contain typical alloying constituents for ductile iron, for example, carbon, silicon and manganese and optionally copper, nickel and/or molybdenum, with the balance iron and incidental impurities such as chromium, phosphorus, sulfur, etc. In one embodiment, the ductile iron alloy composition comprises, by weight of the alloy, about 3.0 to about 4.5 percent silicon, about 2.0 to about 3.0 percent nickel, up to about 0.2 percent manganese, up to about 0.03 percent chromium, up to about 0.01 percent vanadium, and the balance iron and incidental impurities. More particularly, this ductile iron alloy composition may include about 0.001 to about 0.2 percent manganese, about 0.001 to about 0.03 percent chromium, and about 0.001 to about 0.01 percent vanadium. The alloys may also optionally include up to about 0.3% molybdenum and up to about 0.8% copper. As known in the art, the level for carbon is necessary for graphite formation and castability considerations. The role of silicon is generally to promote the formation of graphite instead of metastable iron carbide during solidification. The carbon content separates as spheroidal graphite during solidification, primarily as the result of the presence of silicon. The spheroidal graphite imparts such desirable properties as high strength and toughness for which ductile iron alloys are known. Molybdenum can be included to increase ausferrite hardenability and retard pearlite formation in austempered ductile irons. Manganese can be included to scavenge sulfur, which is preferably absent from the alloy but is usually unavoidably present as an impurity. For castings having a relatively thick section, such as the main wind turbine shaft 18, phosphorus is considered detrimental because it counteracts the effects of molybdenum. Therefore, phosphorous levels are preferably kept at levels as low as possible, for example, below 0.1 weight percent. Also in heavy section castings such as the wind turbine shaft 18, relatively high levels of copper, nickel and molybdenum may be necessary for ausferrite hardenability considerations, for example, toward the upper ends of their above-stated ranges. Generally, preferred alloy additions and their relative amounts can be balanced to achieve sufficient hardenability for a given section size, while reducing alloy segregation levels and cost.

After providing 110 a melt of a ductile iron alloy composition 40, method 100 also includes casting 120 the melt into a mold to form a casting 72. In order to obtain a desirable refined grain microstructure, high graphite nodule count and minimal microsegregation of the alloying constituents to grain boundaries and resultant porosity, a melt of the ductile iron alloy 40 can be cast using a faster solidification rate process, which as used herein refers to a process capable of solidifying a melt of a ductile iron alloy at a rate sufficient to obtain a high graphite nodule count. As an example, suitable rapid solidification processes achieve a graphite nodule count of greater than 100 per square millimeter, more preferably, about 150 to about 300 per square millimeter. Such cooling rates are also capable of achieving a refined grain size throughout the casting and reducing the microsegregation of alloying constituents to the intercellular regions or grain boundaries of the casting. An acceptable level of microsegregation is indicated by achieving a nodule count above 100 per square millimeter and a matrix that is essentially free of martensite, pearlite, and intercellular carbides in other words, martensite, pearlite and intercellular carbide contents of less than 5 volume percent in the matrix. On the other hand, excessive microsegregation at eutectic cell boundaries can be indicated by a low nodule count and high pearlite fractions if the cooling rate to the austempering temperature is insufficient, or by a low nodule count and an excessive martensite content (above 5 volume percent) and a low ausferrite content (below 85 volume percent) in the matrix due to insufficient stabilization of the carbon-enriched austenite during the isothermal austempering.

Casting 120 may be accomplished using any suitable casting method for casting ductile iron, and more particularly may be cast into any suitable mold 70 as described herein. In one exemplary embodiment, the article may be sand cast as illustrated in FIG. 4 where casting sand 73 is compacted around a fugitive pattern (not shown) that is generally removed by heating, such as by pyrolysis, to define the shape and size of the mold cavity 74, or cast in a permanent or shell mold (not shown) formed from a refractory material and generally surrounded by a compacted casting sand to provide support for the shell, to provide ductile iron article 6. Any suitable form of casting 120 may be utilized so long as it is compatible with the cooling 130 and heating 140 by flowing a heat transfer medium through the mold 70 proximate casting 72 as described herein.

In the various embodiments, method 100 generally includes cooling 130 the casting 72 from above the upper temperature limit for proeutectoid ferrite ($A_3$) where the microstructure comprises stable austenite to an austempering temperature ($T_A$) by circulating a suitable coolant through the mold 70. The coolant will be selected to obtain a rapid cooling or quench rate in the ductile iron article 6 sufficient to avoid the formation of ferrite or pearlite as illustrated generally in the TTT diagram shown in FIG. 5. Any suitable coolant may be used particularly various coolant fluids that when circulated as a flow (F) have a high heat capacity for removal of heat from the mold 70 and casting 72. Coolant fluids will be selected so that the coolant fluid flow (F) into the mold 70 has a temperature that is lower than the austempering temperature so that it is configured to remove heat from the mold 70 and casting 72 and obtain a rapid cooling rate sufficient to avoid the formation of ferrite and/or pearlite and lower the temperature of the casting 72 to the austempering temperature ($T_A$). Suitable fluid coolants include low pressure steam, liquid water, a molten salt or a molten metal, or a combination thereof. As known in the art, the austempering temperature ($T_A$) is above the martensite start temperature ($M_S$) of the ductile iron alloy to avoid formation of martensite in the casting 72. Cooling 130 of casting 72 in the mold 70 is contrasted with conventional cooling of ductile iron articles by quenching the article into a molten salt bath, which requires sufficient molten coolant and a bath that is large enough to accept the ductile iron article, and holding the article during cooling to an austempering temperature and a subsequent austempering heat treatment. This process has not been used for very large ductile iron articles, such as, for example, wind turbine rotors. This may be due to the fact that there are very few facilities worldwide that have salt baths of sufficient size to accommodate the such large ductile iron castings or the castings and their molds, and the throughput constraints associated with the cooling and subsequent heat treatment cycles have made this process uneconomical and generally not useful for very large ductile iron articles. Other conventional alternatives to the process described including cooling the cast ductile iron article to room temperature followed by a subsequent reheat to an austenitizing temperature followed by an austempering heat treatment. This process has also not been used for very large ductile iron articles, such as, for example, wind turbine rotors. This may also be due to the fact that there are very few facilities worldwide that have salt baths or furnaces of sufficient size to accommodate such large ductile iron castings for reheating. This fact, coupled with fact that the throughput constraints associated with the subsequent reheat cycles for articles having such large thermal mass, may have made this process uneconomical and generally not useful for very large ductile iron articles, particularly wind turbine shafts. Thus, the method 100 advantageously removes the limitations associated with the sizes of salt bath furnaces used with the direct and in-mold austempering approach described above. Further, the method 100 advantageously reduces or eliminates the need to cool and reheat the castings before performing the austenitization and austempering heat treatments associated with the cool/reheat approach described above thereby reducing cycle time and increasing the efficiency of the casting process compared to conventional ductile iron casting methods. In addition, as described, the Si level of the ductile iron alloy composition can advantageously be raised to about 4.5 wt. % to further promote formation of graphite nodules without reducing the carbon content of the austenite, which also provides solid solution strengthening of the ausferrite matrix by providing solid solution strengthening of the acicular ferrite. Further, the use of high heat capacity coolants described may be employed to provide a finer cell structure, which will also tend to provide enhanced mechanical properties, particularly strength and toughness.

The mold 70 used for casting 120 has a mold cavity 74 that defines the shape of the casting 72 of the ductile iron article 6, such as main wind turbine shaft 18. The mold 70 also includes at least one fluid conduit 76 proximate the mold cavity 74 that is configured to receive the coolant fluid in the case of cooling 130 or cooling 150, or the heating fluid in the case of heating 140, respectively. In one embodiment, the at least one fluid conduit 76 comprises a plurality of conduits disposed within the mold 70 proximate the mold cavity 74 and configured for thermal communication with the casting 72 and mold 70 for the removal or addition of heat from the casting 72 and mold 70, respectively. In one embodiment, as illustrated in FIG. 4, the mold includes a plurality of fluid conduits 76. These may include axially-extending fluid conduits 78. In one embodiment as shown in FIG. 4, these axially-extending fluid conduits 78 may be circumferentially-disposed about the casting 72, that is, they are spaced around the circumference of the casting 72. In another embodiment, as also illustrated in FIG. 4, the fluid conduits 76 may also include a plurality of discrete, circumferentially-extending rings 80 that are axially spaced apart along the axis 34 of the casting 72. In yet another embodiment, as also illustrated in FIG. 4, the fluid conduits 76 may also include axially and circumferentially extending rings comprising a coil 82 that is disposed about the mold cavity 74. Fluid conduits may be formed of any suitable material that is configured to conduct heat out of (in the case of cooling 130 or cooling 150) or into (in the case of heating 140) the mold 70 and casting 72. In one embodiment, the fluid conduits 76 may include various metal tubes or pipes, including those formed from various grades of steel, such as various grades of stainless steel, copper alloys and the like. Advantageously, one or more mold 70 may be connected to one or more fluid circuit 84 for routing the coolant or coolants, or heating fluid or fluids, needed for each mold to and from a centralized heat exchange device 86, or a plurality of devices, where heat may be removed from the coolant(s) or added to the heating fluid flow (F), as the case may be. This allows many molds 70 and castings 72 to have their temperatures regulated from one or more centralized source, or from various distributed sources, but does not require individual furnaces for heat treatment as is typical for conventional austempering heat treatment processes. This is particularly advantageous due to the size of the furnaces needed to heat treat very large ductile iron articles and the costs associated with building, maintaining and operating them that may be avoided by the use of method 100.

After cooling 130, the method 100 also includes heating 140 the casting to maintain the austempering temperature ($T_A$) for an interval sufficient to form an austempered ductile iron article 8 that comprises a microstructure comprising ausferrite, as described herein. Austempering may be performed in a temperature range of about 230° C. to about 400° C., and the austempering temperature may be held for a duration of about one to about four hours, though greater and lesser temperatures and durations are also possible. Heating 140 is required to maintain the austempering temperature due to the heat loss from the mold 70 and casting 72 that would naturally occur if additional heat is not supplied. At the austempering temperature, the casting undergoes an ausferrite transformation in which the parent face centered cubic crystal lattice austenite is transformed to ausferrite which comprises acicular ferrite in a high carbon stabilized austenite matrix. In general, a high austempering temperature will tend to promote greater fatigue strength and ductility, while a low austempering temperature will tend to promote greater strength and wear resistance. Accordingly, the austempering temperature can be chosen to promote certain properties of the ductile iron wind turbine shaft 18, depending on its particular requirements.

Figure 5:
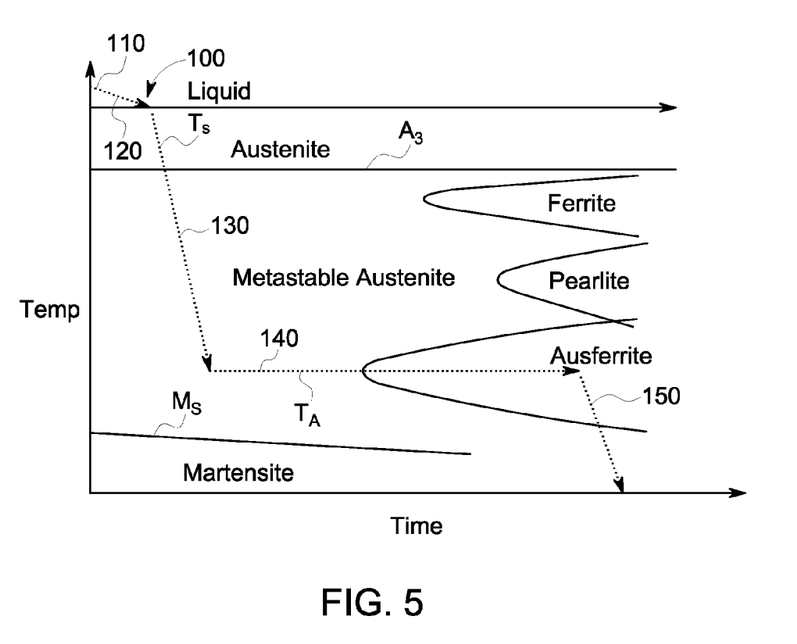
FIG. 5 is a schematic illustration of a time-temperature-transformation (TTT) diagram of a ductile iron alloy composition having a thermal profile of a method as disclosed herein superimposed thereon.

In the various embodiments, method 100 and heating 140 generally includes heating the casting 72 to achieve or maintain an austempering temperature ($T_A$) by circulating a flow (F) of suitable heating fluid through the mold 70. Any suitable heating fluid may be used. The heating fluid will be selected to obtain a heating rate in the ductile iron article 6 sufficient to maintain the austempering temperature as illustrated generally in the TTT diagram shown in FIG. 5. Any suitable heat transfer medium may be used, including heating fluids that have a high heat capacity for the addition of heat to the mold 70 and casting 72. Heating fluids will be selected so that the heating fluid flowing into the mold 70 has a temperature that is greater than or equal to the austempering temperature so that it is configured to add heat to the mold 70 and casting 72 and obtain a rapid heating rate sufficient to maintain the transformation to ausferrite and maintain the austempering temperature ($T_A$). Suitable heating fluids include high pressure steam, a molten salt or a molten metal, or a combination thereof. As known in the art, the austempering temperature is above the martensite start temperature of the ductile iron alloy to avoid formation of martensite in the casting as shown in FIG. 5.

The importance of the quench method and quench rate should also be noted. The equipment used to cool the casting from the austenitization temperature to the austempering temperature can be optimized to promote the kinetics of the austempering process and promote a complete transformation across the entire section thickness, thereby limiting the propensity to form brittle phases. In particular, the use of the mold 70 employing coolant and heating fluid as described herein preferably promotes a more efficient heat transfer to and from the casting 72 and mold 70 to the heat transfer medium, thereby promoting the cooling 130 and heating 140 necessary to achieve the ausferrite transformation. This may promote faster reaction kinetics than those achievable with conventional processes and enable transforming a given wall-section thickness more rapidly, or enable transforming a given wall-section to a deeper depth, as compared to a similar ductile iron article 6 heat treated with conventional processes. Such modifications and alternatives may also be able to compensate for shortcomings of the casting process that resulted in one or more of the preferred characteristics (refined grain microstructure, high graphite nodule count, and minimal microsegregation) being incompletely met. In any event, the casting 72 is quenched fast enough during cooling 120 to avoid pearlite formation, such as, for example, at a rate of at least 5.5° C./minute. The quench rates needed to do so during cooling 120 will depend in part on the alloy composition, and particularly on how much nickel, molybdenum, copper, etc., are present in the alloy, for example.

Following heating 140 and the austempering soak, the method 100 may also optionally include cooling 150 the austempered ductile iron article 8 by further circulation of a coolant flow (F) through the mold. The coolant used may be one of the same coolants as used above for cooling 130. The coolant may be the same coolant employed for cooling 130, or a different coolant. The casting 72 can be allowed to cool to room temperature to provide austempered ductile iron articles 8, such as austempered ductile iron wind turbine shaft 18, as described herein. The resulting austempered casting 72 is characterized by being through-hardened and having a microstructure made up of a matrix that is substantially, if not entirely, ausferrite and substantially, if not entirely, free of martensite and pearlite and provide the desired mechanical properties for the casting, including hardness, impact strength, tensile strength, fatigue strength and toughness, particularly portions of the ductile iron wind turbine shaft 18 that have high operating stresses, such as the shaft body 38, transition collar 36 or hub flange 30, where higher structural requirements are typically necessary. Cooling 150 is advantageous because it may also be performed rapidly and at a controlled cooling rate while the casting 72 is still in the mold and does not require additional facilities or equipment, such as quenching facilities and equipment to cool the casting 72 to room temperature under controlled conditions. Cooling 150 is also an improvement over air cooling of the casting 72, which may not require specialized facilities or equipment, but which has reduced throughput due to the time required to cool large austempered ductile iron articles 8 to room temperature.

Ductile iron articles 8, including wind turbine shaft 18, produced according to method 100 are capable of exhibiting strength-toughness combinations that can rival low alloy steels, while offering such potential advantages as better wear resistance and better vibration and noise damping, along with the potential for weight reduction and cost savings. The machinability of the austempered through-hardened ductile iron articles 8, including wind turbine shafts 18, are likely comparable to a heat treated steel. However, austempered ductile iron articles 8 are also likely to exhibit less distortion compared to a shaft of similar size and design produced by a quench and tempering operation. As a result, the dimensional changes that occur during austempering can be accurately predicted to limit the amount of final machining operations necessary.

The terms "a" and "an" herein do not denote a limitation of quantity, but rather denote the presence of at least one of the referenced items. The modifier "about" used in connection with a quantity is inclusive of the stated value and has the meaning dictated by the context (e.g., includes the degree of error associated with measurement of the particular quantity). Furthermore, unless otherwise limited all ranges disclosed herein are inclusive and combinable (e.g., ranges of "up to about 25 weight percent (wt. %), more particularly about 5 wt. % to about 20 wt. % and even more particularly about 10 wt. % to about 15 wt. %" are inclusive of the endpoints and all intermediate values of the ranges, e.g., "about 5 wt. % to about 25 wt. %, about 5 wt. % to about 15 wt. %", etc.). The use of "about" in conjunction with a listing of constituents of an alloy composition is applied to all of the listed constituents, and in conjunction with a range to both endpoints of the range. Finally, unless defined otherwise, technical and scientific terms used herein have the same meaning as is commonly understood by one of skill in the art to which this invention belongs. The suffix "(s)" as used herein is intended to include both the singular and the plural of the term that it modifies, thereby including one or more of that term (e.g., the metal(s) includes one or more metals). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments.

It is to be understood that the use of "comprising" in conjunction with the alloy compositions described herein specifically discloses and includes the embodiments wherein the alloy compositions "consist essentially of" the named components (i.e., contain the named components and no other components that significantly adversely affect the basic and novel features disclosed), and embodiments wherein the alloy compositions "consist of" the named components (i.e., contain only the named components except for contaminants which are naturally and inevitably present in each of the named components).

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of making an austempered ductile iron article, comprising:
   providing a melt of a ductile iron alloy composition;
   casting the melt into a mold to form a casting, the mold comprising a mold cavity;
   cooling the casting to an austempering temperature by circulating a coolant through the mold, the coolant circulating within at least one enclosed fluid conduit that is disposed within the mold proximate the mold cavity; wherein cooling comprises solidifying the melt and forming a ductile iron article; and
   heating the casting to maintain the austempering temperature for an interval sufficient to form an austempered ductile iron article that comprises a microstructure comprising ausferrite.

2. The method of claim 1, further comprising cooling the austempered ductile iron article after heating by circulation of a coolant through the mold using the fluid conduit.

3. The method of claim 2, wherein the microstructure comprises solid solution strengthened ausferrite.

4. The method of claim 1, wherein the ductile iron alloy composition comprises, by weight of the alloy: about 3.0 to about 4.5 percent silicon, about 2.0 to about 3.0 percent nickel, up to about 0.2 percent manganese, up to about 0.03 percent chromium, up to about 0.01 percent vanadium, and the balance iron and incidental impurities.

5. The method of claim 4, wherein the ductile iron alloy composition comprises about 0.001 to about 0.2 percent manganese, about 0.001 to about 0.03 percent chromium, and about 0.001 to about 0.01 percent vanadium.

6. The method of claim 4, wherein the ductile iron alloy composition is selected so that the as-cooled microstructure comprises solid solution strengthened ausferrite.

7. The method of claim 1, wherein circulating the coolant comprises circulating a coolant fluid through the fluid conduit, wherein the coolant fluid is configured to remove heat from the ductile iron article.

8. The method of claim 7, wherein the coolant fluid has a temperature lower than the austempering temperature.

9. The method of claim 7, wherein the coolant fluid comprises low pressure steam, liquid water, a molten salt or a molten metal, or a combination thereof.

10. The method of claim 2, wherein cooling the austempered ductile iron article comprises circulating a coolant fluid through the mold using the fluid conduit, wherein the coolant fluid is configured to remove heat from the ductile iron article.

11. The method of claim 10, wherein the coolant fluid has a temperature lower than the austempering temperature.

12. The method of claim 10, wherein the coolant fluid comprises low pressure steam, liquid water, a molten salt or a molten metal, or a combination thereof.

13. The method of claim 1, wherein heating comprises circulating a heating fluid through the mold using the fluid conduit, wherein the heating fluid is configured to provide heat to the ductile iron article.

14. The method of claim 13, wherein the heating fluid comprises a high pressure steam, a molten salt or a metal, or a combination thereof.

15. The method of claim 13, wherein the heating fluid has a temperature greater than or equal to the austempering temperature.

16. The method of claim 1, wherein the ductile iron article comprises a shaft having a length of 2 meters or more, a diameter of 1 meter or more and an austempered microstructure comprising an ausferrite matrix and a plurality of graphite nodules disposed therein, the graphite nodules having a nodule count greater than 100 per square millimeter.

17. The method of claim 1, wherein the fluid conduit comprises a plurality of fluid conduits.

18. The method of claim 1, wherein the mold has a longitudinal axis and the conduit comprises an axially-extending conduit.

19. The method of claim 1, wherein the conduit comprises a circumferentially extending conduit.

20. The method of claim 1, wherein the austempered ductile iron article comprises a wind turbine shaft.

* * * * *